United States Patent [19]

Younes

[11] Patent Number: 4,626,573
[45] Date of Patent: Dec. 2, 1986

[54] FLAME-RETARDANT MOLDED COMPOSITION INCORPORATING A POLY(N-(BROMOPHENYL)MALEIMIDE-CO-STYRENE-CO-MALEIC ANHYDRIDE) COPOLYMER

[75] Inventor: Usama E. Younes, Newtown Square, Pa.

[73] Assignee: Atlantic Richfield Company, Los Angeles, Calif.

[21] Appl. No.: 849,640

[22] Filed: Apr. 9, 1986

Related U.S. Application Data

[62] Division of Ser. No. 685,361, Dec. 24, 1984, Pat. No. 4,604,422.

[51] Int. Cl.$^4$ .................. C08F 212/06; C08F 212/08; C08F 226/06; C08L 45/00
[52] U.S. Cl. ..................... 525/148; 521/147; 524/513; 524/516; 524/549; 525/132; 525/205; 526/262
[58] Field of Search ............... 521/147; 524/513, 516, 524/549; 525/132, 148, 205; 526/262

[56] References Cited

U.S. PATENT DOCUMENTS 4,302,484 11/1981 Rosenkranz .................. 526/262
4,388,451 6/1983 Culbertson et al. ............. 526/262

Primary Examiner—Harry Wong, Jr.
Attorney, Agent, or Firm—Dennis M. Kozak

[57] ABSTRACT

A moldable composition which comprises a novel random N-(brominated or chlorinated phenyl) maleimide-containing copolymer, a thermoplastic resin, preferably, polycarbonate and a flame retardant synergist is disclosed. The molded composition exhibits at least a 94 V-1 classification when tested in accordance with Underwriters Laboratories Inc. Test Method UL94.

7 Claims, No Drawings

FLAME-RETARDANT MOLDED COMPOSITION INCORPORATING A POLY(N-(BROMOPHENYL)MALEIMIDE-CO-STYRENE-CO-MALEIC ANHYDRIDE) COPOLYMER

This is a division of application Ser. No. 685,361 filed Dec. 24, 1984, now U.S. Pat. No. 4,604,422.

This invention relates to polymers.

In one of its more specific aspects, this invention relates to a moldable composition which, upon molding, exhibits excellent nonflammability properties.

The present invention provides a composition which comprises a random N-(chlorinated or brominated phenyl)maleimidecontaining copolymer, a flame retardant "synergist" and, optional a thermoplastic resin such as, for example, polycarbonate. The composition of this invention, upon molding, exhibits at least a 94V-1 classification when tested in accordance with Underwriters' Laboratories Inc. Test Method UL 94.

According to this invention there is provided a moldable composition comprising a random copolymer comprised of the following recurring units:

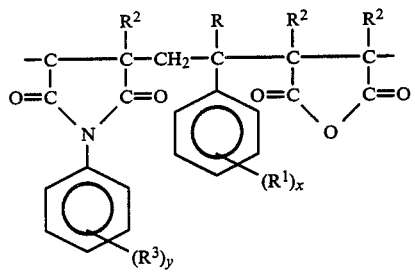

wherein R represents —H, —CH$_3$, or —CH$_2$CH$_3$; R$^1$ represents —CH$_3$, —CH$_2$CH$_3$, —CH(CH$_3$)$_2$, —C(CH$_3$)$_3$, —OH, —OCH$_3$, —CO$_2$H, —CONH$_2$, or —CON(CH$_3$)$_2$; each R$^2$ separately represents —H or —CH$_3$; R$^3$ represents —Cl or —Br; x represents an integer of from 0 to 3, y represents an integer of from 1 to 3; a flame-retardant synergist and, a thermoplastic resin with the proviso that the random copolymer and the thermoplastic resin cannot be the same.

Also, according to this invention there is provided a method for producing a molded article which comprises (1) blending a random copolymer comprised of the following recurring units:

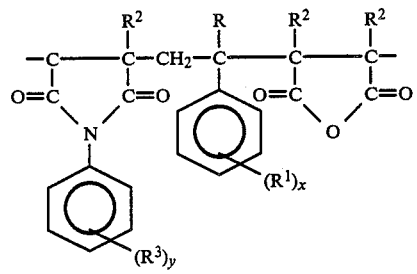

wherein R represents —H, —CH$_3$, or —CH$_2$CH$_3$; R$^1$ represents —CH$_3$, —CH$_2$CH$_3$, —CH(CH$_3$)$_2$, —C(CH$_3$)$^3$, —OH, —NH$_2$, —OCH$_3$, —CO$_2$H, —CONH$_2$, or —CON(CH$_3$)$_2$; each R$^2$ separately represents —H or —CH$_3$; R$^3$ represents —Cl or —Br; x represents an integer from 0 to 3 and wherein y represents an integer of from 1 to 3; a flame-retardant synergist and a thermoplastic resin with the proviso that the random copolymer and the thermoplastic resin cannot be the same and, (2) molding the resulting blend.

According to this invention there is also provided a random copolymer comprised of the following recurring units:

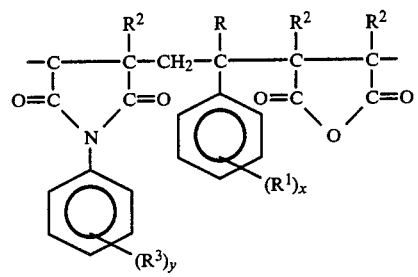

wherein R represents —H, —CH$_3$, or —CH$_2$CH$_3$; R$^1$ represents —CH$_3$, —CH$_2$CH$_3$, —CH(CH$_3$)$_2$, —C(CH$_3$)$_3$, —OH, —NH$_2$, —OCH$_3$, —CO$_2$H, —CONH$_2$, or —CON(CH$_3$)$_2$; each R$^2$ separately represents —H or —CH$_3$; R$^3$ represents —Cl or —Br; x represents an integer of from 0 to 3; and, wherein y represents an integer of from 1 to 3.

In another embodiment of this invention, the random copolymer can be foamed using any conventional method for foaming polymers such as, for example, extruding the random copolymer in contact with a conventional foaming agent or impregnating the copolymer with a foaming agent followed by heating the impregnated copolymer above its glass transition temperature.

In another preferred embodiment of this invention, the total amount of chlorine and/or bromine in the random copolymer will be within the range of from about 2 to about 16 weight percent, preferably, it will be within the range of from about 3 to about 12 weight percent.

In another preferred embodiment of this invention, the thermoplastic resin is a polycarbonate based on bisphenol having the general formula:

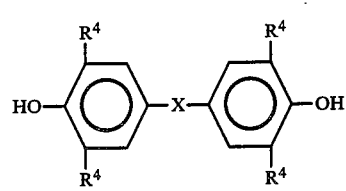

wherein each R$^4$ separately represents —H, a C$_1$ to C$_4$ alkyl group, Cl or Br and wherein X represents a direct bond C$_1$ to C$_8$ alkylene.

In another embodiment of this invention the random copolymer is poly(styrene-co-maleic anhydride-co-N-(brominated phenyl)maleimide.

The N-(brominated or chlorinated phenyl)maleimide which are suitable for use as the first depicted recurring unit in the random polymers of this invention are not known to be commercially available. Suitable N-(brominated phenyl)maleimides are the N-(mono-, di- and tri-bromophenyl)maleimides and include N-(4-bromophenyl)maleimide, N-(4-bromophenyl)citraconimide, N-(2,4,6-trichlorophenyl)maleimide, and N-(2,4,6-tribromophenyl)maleimide. Bromine substituted maleimides are preferred. The random copolymer will comprise from about 3 to about 75 weight percent recurring units of this monomer. Example I demonstrates the preparation of N-(2,4,6-tribromophenyl)maleimide, which is the preferred monomer.

In the practice of this invention, any suitable monomers can be employed to produce the second depicted recurring monomeric unit in the above general structure for the copolymer. Suitable monomers include: styrene, α-methylstyrene, α-ethylstyrene, methylstyrene, isopropylstyrene, t-butylstyrene, vinylbenzoic acid, vinyl phenol, vinyl analine, nitrostyrene, cyanostyrene, methoxystyrene, α-methyl-4-cyanostyrene, α-methyl-4-methylstyrene and the like, and their mixtures. Styrene is the preferred monomer. The random copolymer will comprise from about 40 to about 95 weight percent of recurring units of this monomer.

In the practice of this invention, any suitable monomers can be employed to produce the third recurring monomeric unit in the above general structure. Suitable monomers include: maleic anhydride, phenyl maleic anhydride, citraconic anhydride, itaconic anhydride, chloromaleic anhydride, bromomaleic anhydride and the like, and their mixtures. Maleic anhydride is most preferred. The random copolymer will comprise from about 1 to about 50 weight percent recurring units of this monomer.

Copolymers which are impact modified with rubbers are also suitable for use in this invention. Methods for chemically grafting the random copolymers of this invention to rubbers are well known. See for example, the method taught in Example I of U.S. Pat. No. 3,489,822, which method is incorporated herein by reference thereto.

If the random copolymer of this invention is used to produce molded articles the number average molecular weight of the copolymer should be at least 30,000, preferably it will be from about 80,000 to about 500,000.

To produce a moldable composition of this invention the random copolymer can be conventionally blended with any suitable flame-retardant synergist. The synergist will typically be employed in an amount within the range of from about 1 to about 10, preferably from about 1 to about 5 weight percent of the total composition.

Suitable synergists include: antimony trioxide, antimony pentoxide, arsenic trioxide, arsenic pentoxide, zinc sulfate, zinc oxide, zinc borate, bismuth oxide, molybdenum oxide, tungsten oxide, stannous oxide and the like, and their mixtures. The preferred synergist is antimony trioxide.

Any suitable thermoplastic resin can be employed to produce moldable compositions of this invention. Suitable thermoplastic resins include styrene/maleic anhydride, styrene/acrylonitrile, polyphenylene oxide, styrene/N-phenylmaleimide, polyvinyl chloride, polycarbonate, polyamide, polyesters, polyacrylate, polysulfone and the like and their mixtures. Moreover, impact modified thermoplastic resins such as a rubber modified styrene-maleic anhydride are also suitable for use.

Polycarbonates having the above general formula depicted above are preferred and include 2,2-bis-(4-hydroxyphenyl)-propane; 2,2-bis(3-chloro-4-hydroxyphenyl)-propane, 2,2-bis-(3,5-dimethyl4-hydroxyphenyl)propane; 2,4-bis(3,5-dimethyl-4-hydroxylphenyl)-2-methylbutane. Particularly suitable for use in the practice of this invention is 2,2-bis-(4-hydroxyphenyl)-propane.

The thermoplastic resin will typically be employed in an amount within the range of from about 5 to about 95 weight percent of the composition, preferably, about 40 to about 60 weight percent.

Optionally, the molding composition can include other ingredients. Such as extenders, smoke suppressants, antioxidants, reinforcing fillers, processing aids, pigments, stabilizers, mold release agents and the like, for their conventionally employed purpose.

This invention is further demonstrated by the following examples.

EXAMPLE I

This example demonstrates the preparation of N-(2,4,6-tribromophenyl)maleimide.

Into a reaction vessel were added and mixed 100 g. (0.303 mole) of 2,4,6-tribromoanaline, 68.34 g (0.697 mole) of maleic anhydride, and 5.16 g (0.379 mole) of zinc chloride.

The resulting mixture was heated at a temperature within the range of from about 139° to 148° C. for about 2 hours.

The resulting reaction product was reacted with xylene, filtered and water washed.

The xylene solvent was removed and the result product N-(2,4,6-tribromophenyl)maleimide was recovered at a yield of about 94%.

EXAMPLE II

This example demonstrates the preparation of a poly[styrene-co-maleic anhydride-co-N-(2,4,6-tribromophenyl)maleimide]copolymer of this invention.

Into a one-gallon reactor containing 1034.5 g of styrene and set at 80° C. with agitation was charged over a period of 1½ hours a solution of 2024 g of styrene, 133.3 g of maleic anhydride, 166.8 g of N-(2,4,6-tribromophenyl)maleimide and 3.75 g of benzoyl peroxide. The polymerization reaction was carried with agitation for about six hours; until the reactor contents became viscous. Polymerization was terminated by dispersing the reactor contents into a vessel containing about 10 g of butylated hydroxytoluene.

The resulting copolymer was precipitated from isopropyl alcohol, washed with methanol, and dried at 90° C. for about 18 hours under vacuum. The recovered copolymer was found to have a a weight average molecular weight of 195,000. Elemental analysis found 15% bromine and 9.1% maleic anhydride.

The resulting polymer was dry blended with 4% antimony trioxide, extruded and injection molded. The molded composition was found to have the following properties.

| Property | ASTM | |
|---|---|---|
| Tensile Strength | D-638 | 7,400 psi |
| Flexural Strength | D-790 | 13,800 psi |
| Flexural Modulus | D-790 | 540,000 psi |
| Notched Izod | D-256 | 0.4 ft-lbs/in |

EXAMPLE III

This example demonstrates the preparation of a rubber modified poly[styrene-co-maleic anhydride-co-N-(2,4,6-tribromophenyl)maleimide] copolymer of this invention.

A four-liter, jacketed stainless steel reactor was used for the polymerization. The monomeric feed consisted of the following amounts of ingredients:

| | |
|---|---|
| 1665 | Styrene |
| 70 | Maleic Anhydride |
| 210 | N—(2,4,6-tribromophenyl maleimide) prepared according to Example I |
| 166 | Stereon ® 720 SBR-10% bound rubber (Firestone) |
| 0.62 | Benzoyl Peroxide |
| 1.5 | Irganox ® 1706 Stabilizer |
| 1.0 | Polygard ® HR antioxidant (Uniroyal) |

The monomeric mixture was continuously fed into the top of the reactor at an average rate of about 1.7 lb/hour. The polymerization was carried out 110°–115° C. (to about 50% conversion to polymer) and the polymer syrup was collected through a dip tube from the bottom of the reactor. The resulting polymer was thinly spread on Mylar resin sheets and was allowed to air dry for 48 hours and for an additional 72 hours at 90° C., under reduced pressure. The resulting copolymer was finely ground using a Wiley Mill. Chemical analysis of the copolymer gave 6.4% maleic anhydride and 20% N(2,4,6-tribromophenyl)maleimide by weight. The copolymer was tested and found to have a weight average molecular weight of 230,000 by gel permeation chromatograph; and a glass transition temperature of 152° C. by DSC.

The resulting copolymer was dry blended with 4% antimony trioxide, extruded and injection molded. The molded composition was found to have the following properties. The ASTM test methods identified above were used.

| Property | |
|---|---|
| Tensile Strength | 5,400 psi |
| Flexural Strength | 9,300 psi |
| Flexural Modulus | 288,000 psi |
| Notched Izod | 1.0 ft-lbs/in |
| DTUL (⅛", unannealed) | 112° F. |

EXAMPLE IV

About 45% by weight of the copolymer-synergist composition produced in Example III was melt blended at 550° F. with about 55% by weight of Mobay Merlon M-40 Polycarbonate (2,2-bis(4-hydroxyphenyl)-propane) extruded and injection molded. The resulting molded blend was tested and found to have the following physical properties:

| | |
|---|---|
| Tensile Strength | 7,000 psi |
| Flexural Strength | 12,000 psi |
| Flexural Modulus | 317,000 psi |
| Notched Izod | 3.5 ft-lbs/in |
| DTUL (⅛", unannealed) | 116° F. |

Molded blends were also tested for flammability in accordance with Underwriters Laboratories UL 94 Test Method (UL 94 Standard for Tests for Flammability of Plastic Materials For Parts in Devices and Appliances. UL 94, third edition Jan. 24, 1980).

In this UL 94 Vertical Burning Test, the molded blend test specimen was supported from the upper end, with the longest dimension vertical, by a clamp on a ring stand so that the lower end of the specimen was 1" above the top of the burner tube. The burner was then placed remote from the sample, ignited, and adjusted to produce a blue flame 1" in height. The test flame was placed centrally under the lower end of the test specimen and allowed to remain for 10 seconds. The test flame was then withdrawn, and the duration of flaming or glowing combustion of the specimen was noted. If flaming or glowing combustion of the specimen ceased within 30 seconds after removal of the test flame, the test flame was again placed under the specimen for 10 seconds immediately after flaming or glowing combustion of the specimen stopped. The test flame was again withdrawn, and the duration of flaming or glowing combustion of the specimen was noted. If the specimen dripped flaming particles or droplets while burning in this test, these drippings were allowed to fall onto a horizontal layer of cotton fibers (untreated surgical cotton) placed one foot below the test specimen. Significantly flaming particles were considered to be those capable of igniting the cotton fibers. The duration of flaming or flowing combustion of vertical specimens after application of the test flame (average of 5 specimens with 10 flame applications) should not exceed 25 seconds (maximum not more than 30 seconds) and the portion of the specimen outside the clamp should not be completely burned in the test.

Materials which comply with the above requirements and do not drip any flaming particles or droplets during the burning test are classified as "V-1". Materials which comply with the above requirement but drip flaming particles or droplets which burned briefly during the test are classified as "V-2". A "V-0" rating is given to materials wherein the duration of flaming or glowing combustion averages less than 5 seconds under the conditions specified above.

The results of the UL 94 testing was as follows:

| Molded Blend of | UL 94 (5" × ½" × ⅛" bar) |
|---|---|
| Example 2 | V-0 |
| Example 4 | V-0 |

It will be evident from the foregoing that various modifications can be made to this invention. Such, however, are considered as being within the scope of the invention.

What is claimed is:

1. A method for producing a molded article which comprises (1) blending a random copolymer comprised of the following recurring units:

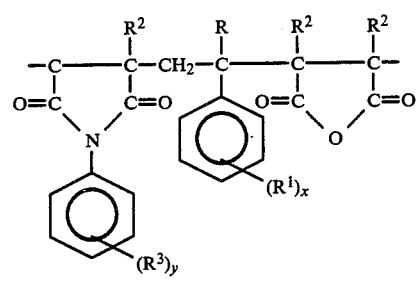

wherein R represents —H, —CH$_3$, or —CH$_2$CH$_3$; R$^1$ represents —CH$_3$, —CH$_2$CH$_3$, —CH(CH$_3$)$_2$, —C(CH$_3$)$^3$, —OH, —OCH$_3$, —CO$_2$H, —CONH$_2$, or —CON(CH$_3$)$_2$; each R$^2$ separately represents —H or —$CH_3$; $R^3$ represents a —Cl or —Br; x represents an integer from 0 to 3 and wherein y represents an integer of from 1 to 3; a flame-retardant synergist and a thermoplastic resin with the proviso that the random copolymer and the thermoplastic resin cannot be the same; and, (2) molding the resulting blend.

2. The method of claim 1 in which said thermoplastic resin is a polycarbonate based on bisphenol having the general formula:

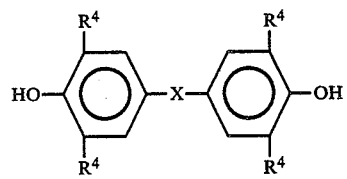

wherein each $R^4$ separately represents —H, a $C_1$ to $C_4$ alkyl group, Cl, or Br and wherein X represents a direct bond $C_1$ to $C_8$ alkylene.

3. The method of claim 1 comprising molding said blend in contact with a reinforcing filler.

4. A random copolymer comprised of the following recurring units:

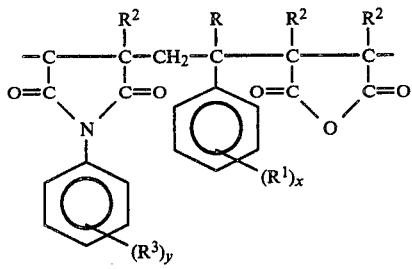

wherein R represents —H, —$CH_3$, or —$CH_2CH_3$; $R^1$ represents —$CH_3$, —$CH_2CH_3$, —$CH(CH_3)_2$, —$C(CH_3)_3$, —OH, —$OCH_3$, —$CO_2H$, —$CONH_2$, or —$CON(CH_3)_2$; each $R^2$ separately represents —H or —$CH_3$; $R^3$ represents a —Cl or —Br; x represents an integer of from 0 to 3; and, wherein y represents an integer of from 1 to 3.

5. The random copolymer of claim 4 containing from about 2 to about 16 weight percent bromine or chlorine.

6. The random copolymer of claim 4 containing from about 3 to about 12 weight percent bromine or chlorine.

7. The random copolymer of claim 4 in the form of a foam.

* * * * *